US012673623B2

(12) United States Patent
Yamaguchi et al.

(10) Patent No.: US 12,673,623 B2
(45) Date of Patent: Jul. 7, 2026

(54) VEHICLE CONTROL DEVICE, NON-TRANSITORY COMPUTER-READABLE STORAGE MEDIUM STORING VEHICLE CONTROL PROGRAM, AND VEHICLE CONTROL SYSTEM

(71) Applicant: DENSO CORPORATION, Kariya-city (JP)

(72) Inventors: Hideyuki Yamaguchi, Kariya-city (JP); Satoshi Niwa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 153 days.

(21) Appl. No.: 18/528,189

(22) Filed: Dec. 4, 2023

(65) Prior Publication Data

US 2024/0101049 A1     Mar. 28, 2024

Related U.S. Application Data

(63) Continuation of application No. PCT/JP2022/022822, filed on Jun. 6, 2022.

(30) Foreign Application Priority Data

Jun. 7, 2021     (JP) ................................. 2021-095279

(51) Int. Cl.
B60R 16/02          (2006.01)
(52) U.S. Cl.
CPC .................................... B60R 16/02 (2013.01)

(58) Field of Classification Search
CPC ..... B60R 16/02; B60R 16/037; G06F 9/4411; G06F 8/30
See application file for complete search history.

(56)          References Cited

U.S. PATENT DOCUMENTS

| | | | |
|---|---|---|---|
| 2009/0222842 A1 | 9/2009 | Narayanan et al. | |
| 2010/0287563 A1* | 11/2010 | Kishita ............. | B60W 50/0098 |
| | | | 719/313 |
| 2013/0254773 A1 | 9/2013 | Kimura et al. | |
| 2014/0082640 A1 | 3/2014 | Narayanan et al. | |
| 2017/0352198 A1 | 12/2017 | Hasegawa et al. | |
| 2020/0034354 A1 | 1/2020 | Horita et al. | |

FOREIGN PATENT DOCUMENTS

| | | |
|---|---|---|
| JP | 2011514586 A | 5/2011 |
| JP | 2011162116 A | 8/2011 |
| JP | 2013225297 A | 10/2013 |
| JP | 2016081405 A | 5/2016 |
| JP | 2017220220 A | 12/2017 |
| JP | 2020074191 A | 5/2020 |
| WO | WO-2009093732 A1 | 7/2009 |

* cited by examiner

*Primary Examiner* — Long T Tran
*Assistant Examiner* — Charles J Brauch
(74) *Attorney, Agent, or Firm* — Harness, Dickey & Pierce, PLC

(57)          ABSTRACT

In a vehicle control device, a non-transitory computer-readable storage medium storing a vehicle control program, or a vehicle control system for controlling a controlled target, each of a plurality of output units is one output unit that is configured to transmit a command to a corresponding interface among a plurality of interfaces.

21 Claims, 9 Drawing Sheets

FIG. 2

```
                    ~10                              ~20
  ┌─────────────────────────────┐ ┌─────────────────────────────┐
  │  ~15A          ~15B          │ │  ~25A          ~25B          │
  │ ┌───────┐    ┌───────┐       │ │ ┌───────┐    ┌───────┐       │
6 │ │  APP  │    │  APP  │       │ │ │  APP  │    │  APP  │       │
  │ └───┬───┘    └───┬───┘       │ │ └───┬───┘    └───┬───┘       │
  │     │   ~16A     │   ~16B    │ │     │   ~26A     │   ~26B    │
  │ ┌───▼──────┐ ┌───▼──────┐    │ │ ┌───▼──────┐ ┌───▼──────┐    │
  │ │INPUT UNIT│ │INPUT UNIT│    │ │ │INPUT UNIT│ │INPUT UNIT│    │
  │ └───┬──────┘ └───┬──────┘    │ │ └───┬──────┘ └───┬──────┘    │
  │     │   ~17      │           │ │     │   ~27      │           │
  │ ┌───▼────────────▼────┐      │ │ ┌───▼────────────▼────┐      │
  │ │  CALCULATION UNIT    │◄────┼─┼─►│  CALCULATION UNIT   │      │
  │ └───┬────────────┬────┘      │ │ └───┬────────────┬────┘      │
  │     │   ~18A     │   ~18B    │ │     │   ~28A     │   ~28B    │
  │ ┌───▼───────┐ ┌──▼────────┐  │ │ ┌───▼───────┐ ┌──▼────────┐  │
  │ │OUTPUT UNIT│ │OUTPUT UNIT│  │ │ │OUTPUT UNIT│ │OUTPUT UNIT│  │
  │ └───┬───────┘ └──┬───────┘  │ │ └───┬───────┘ └──┬───────┘  │
  └─────┼────────────┼──────────┘ └─────┼────────────┼──────────┘
        │            │  ~190            │            │  ~290
  ┌─────┼────────────┼──────────┐ ┌─────┼────────────┼──────────┐
  │     │   ~19A     │   ~19B   │ │     │   ~29A     │   ~29B   │
  │ ┌───▼───────┐ ┌──▼────────┐ │ │ ┌───▼───────┐ ┌──▼────────┐ │
  │ │CONTROL IF │ │CONTROL IF │ │ │ │CONTROL IF │ │CONTROL IF │ │
  │ └───────────┘ └───────────┘ │ │ └───────────┘ └───────────┘ │
  │      CONTROL PROGRAM        │ │      CONTROL PROGRAM        │
  └─────────────────────────────┘ └─────────────────────────────┘
```

FIG. 3

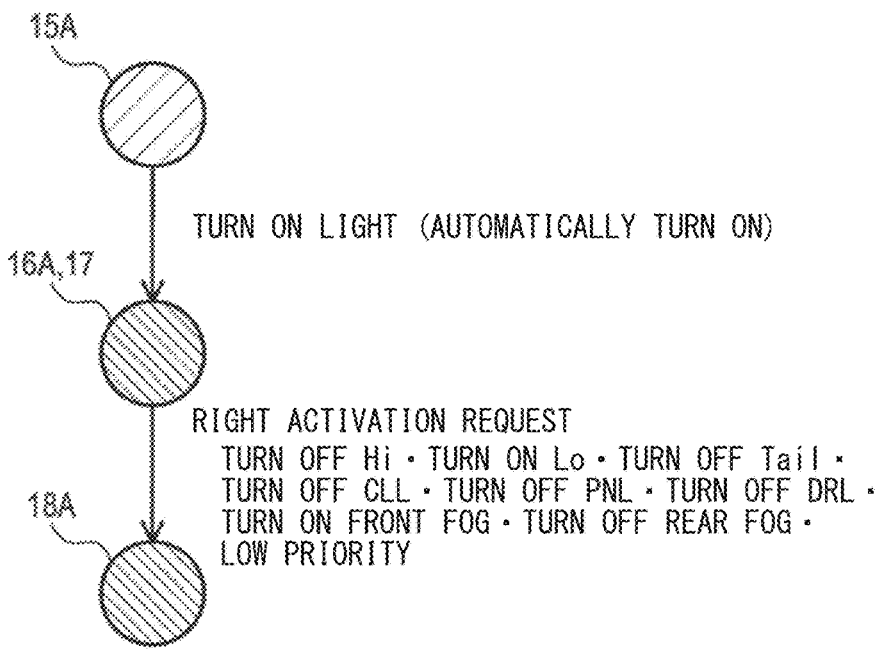

TURN ON LIGHT (AUTOMATICALLY TURN ON)

RIGHT ACTIVATION REQUEST
TURN OFF Hi · TURN ON Lo · TURN OFF Tail ·
TURN OFF CLL · TURN OFF PNL · TURN OFF DRL ·
TURN ON FRONT FOG · TURN OFF REAR FOG ·
LOW PRIORITY

17A

17B

TURN ON HAZARD
TURN OFF ONE MINUTE LATER

TERN ON LOW BEAM &
TURN ON HAZARD

18A

TERN ON LOW BEAM &
TURN ON HAZARD

19A

17Z

18Y

18Z

19Z

VEHICLE CONTROL IF

FIG. 11

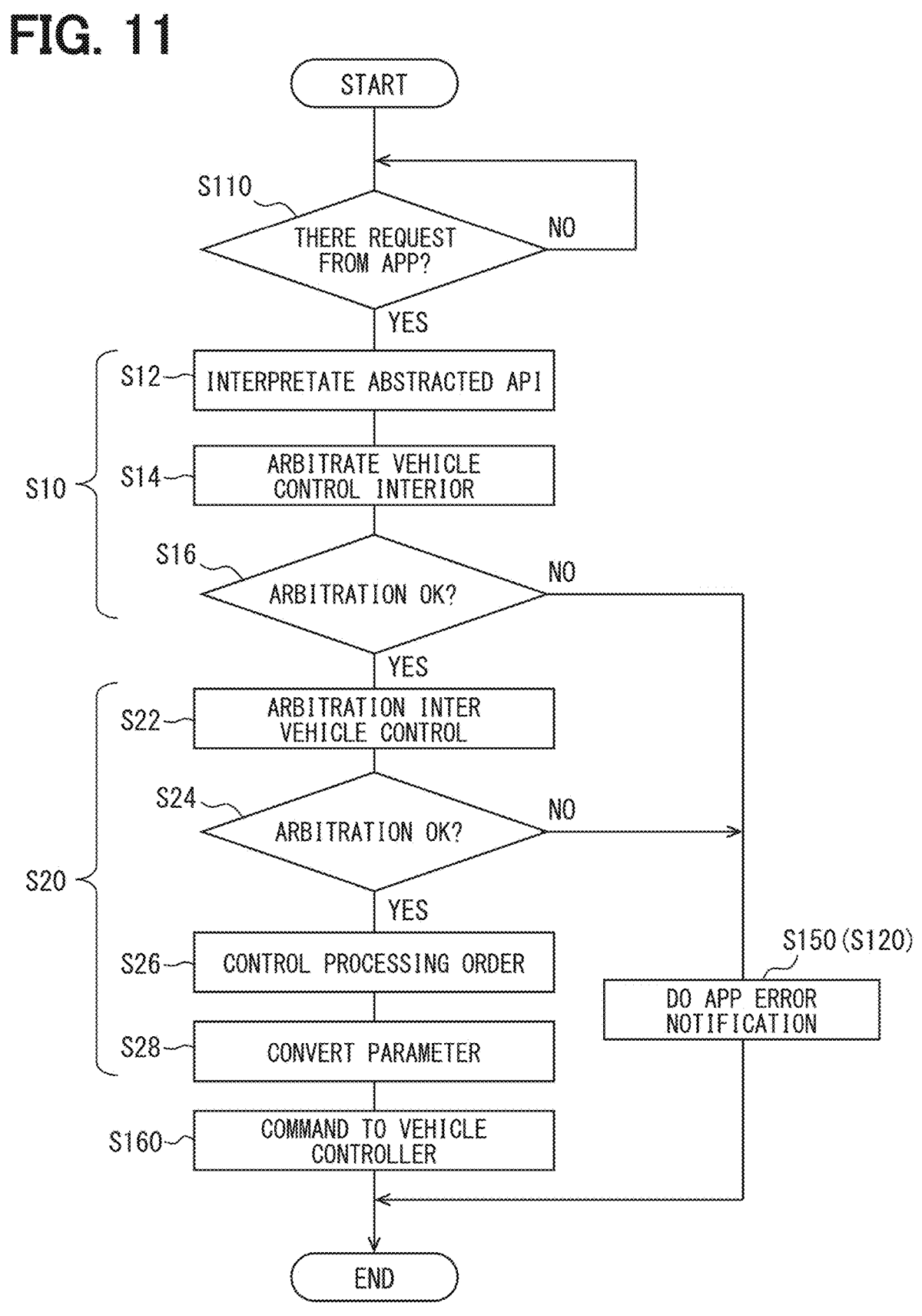

START

S110 — THERE REQUEST FROM APP?

NO

YES

S10
{
S12 — INTERPRETATE ABSTRACTED API

S14 — ARBITRATE VEHICLE CONTROL INTERIOR

S16 — ARBITRATION OK?
}

NO

YES

S20
{
S22 — ARBITRATION INTER VEHICLE CONTROL

S24 — ARBITRATION OK?

NO

YES

S26 — CONTROL PROCESSING ORDER

S28 — CONVERT PARAMETER
}

S150 (S120)

DO APP ERROR NOTIFICATION

S160 — COMMAND TO VEHICLE CONTROLLER

END

FIG. 12

VEHICLE CONTROL DEVICE, NON-TRANSITORY COMPUTER-READABLE STORAGE MEDIUM STORING VEHICLE CONTROL PROGRAM, AND VEHICLE CONTROL SYSTEM

CROSS REFERENCE TO RELATED APPLICATIONS

The present application is a continuation application of International Patent Application No. PCT/JP2022/022822 filed on Jun. 6, 2022, which designated the U.S. and claims the benefit of priority from Japanese Patent Application No. 2021-095279 filed on Jun. 7, 2021. The entire disclosures of all of the above applications are incorporated herein by reference.

TECHNICAL FIELD

The present disclosure relates to a vehicle control device, a non-transitory computer-readable storage medium storing a vehicle control program, and a vehicle control system for controlling a controlled target.

BACKGROUND

A comparative example provides a configuration in which a vehicle is provided with a program called an adapter for adapting commands from an application to a control program. The adapter has a function for adding or changing an application that provides a service, and the control program has a function for controlling a controlled target such as a voice control device.

SUMMARY

In a vehicle control device, a non-transitory computer-readable storage medium storing a vehicle control program, or a vehicle control system for controlling a controlled target, each of a plurality of output units is one output unit that is configured to transmit a command to a corresponding interface among a plurality of interfaces.

BRIEF DESCRIPTION OF DRAWINGS

FIG. 2 is a block diagram showing a software configuration of an ECU.

FIG. 3 is an explanatory diagram showing a processing procedure in a first operation example.

FIG. 11 is a flowchart showing a basic process executed by a vehicle control system.

FIG. 12 is a block diagram showing an example of the hardware configuration of a vehicle control system in further another embodiment.

DETAILED DESCRIPTION

Figure 1:
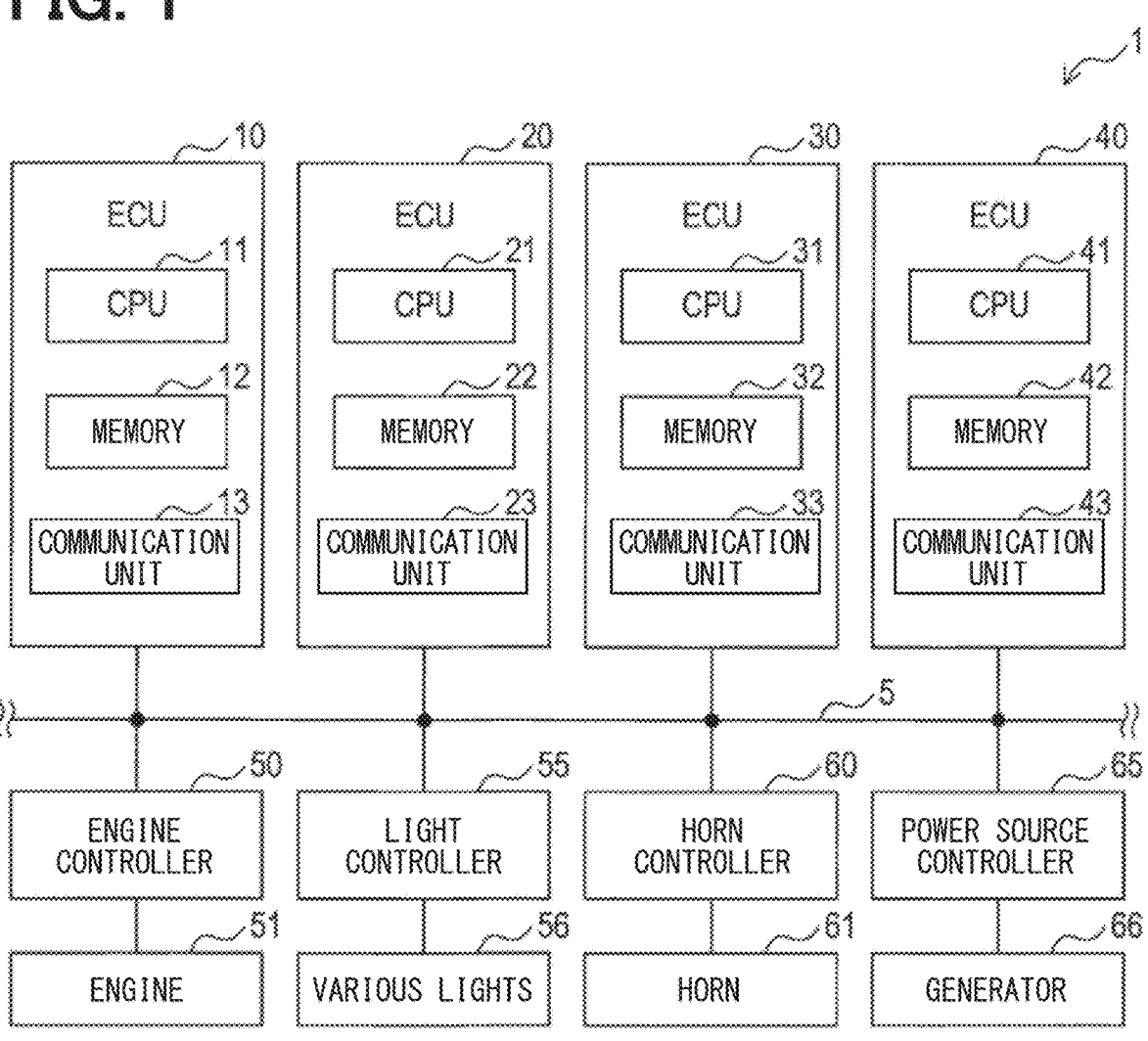
FIG. 1 is a block diagram showing a hardware configuration of a vehicle control system.

As a result of the inventor's detailed study, it has been found that the technology of the comparative example has a difficulty that a wide range of programs should be modified since not only the adapter but also the control program are required to be changed when making changes such as addition or update of an application. This is because, at the time of changing an application, when a plurality of conflicting commands are input to the control program, a failure may occur in operations of the control program.

One example of the present disclosure provides a technology capable of narrowing a range of programs of which modification is required, when changing an application in a vehicle control device, a non-transitory computer-readable storage medium storing a vehicle control program, and a vehicle control system configured to control a controlled target.

One example embodiment of the present disclosure is a vehicle control device that is located in the vehicle and configured to control the controlled targets by transmitting a command to the control program for controlling the controlled targets. The control program including a plurality of interfaces for exchanging a parameter. The vehicle control device includes at least one first command unit, a plurality of output units, and at least one second command unit.

The first command unit is configured to output a first command that does not specify an interface to the control program. The output unit is configured to output the input command to a corresponding interface.

The second command unit is further configured to select an output that transmits a command among the plurality of output units based on the first command, and cause each selected output unit to transmit a second command to the corresponding interface, the second command being a command corresponding to the first command and representing a command for causing the selected output unit to perform transmission. Each of the plurality of output units is one output unit that is configured to transmit the second command to a corresponding interface among the plurality of interfaces.

According to such a configuration, each of the plurality of output units is configured such that for each of the plurality of interfaces, only one output unit transmits the second command to the interface. Accordingly, when changing the first command unit such as an application, it is possible to eliminate the need to change the control program by simply changing the configuration of the second command unit. Therefore, it is possible to further narrow the range of programs to be modified.

Hereinafter, embodiments of the present disclosure will be described with reference to the drawings. Note that ECUs 10, 20, 30, and 40 in the embodiments correspond to a vehicle control device in the present disclosure, and applications 15A, 15B, 25A, and 25B in the embodiments correspond to a first command unit in the present disclosure. Further, calculation units 17 and 27 in the embodiment correspond to a second command unit in the present disclosure, and output units 18 and 28 in the embodiment correspond to an arbitration unit in the present disclosure. Further, control IFs 19 and 29 in the embodiment correspond to an interface in the present disclosure, and an API unit 6 in the embodiment corresponds to a vehicle control program in the present disclosure.

1. First Embodiment (1-1. Configuration)

A vehicle control system 1 shown in FIG. 1 is mounted on a vehicle such as, for example, a passenger car, and includes a plurality of ECUs (electronic control units) 10, 20, 30, and 40 (hereinafter referred to as 10 to 40) and various controllers 50, 55, 60, and 65 (hereinafter referred to as 50 to 65) and controlled targets 51, 56, 61, 66 (hereinafter referred to as 51 to 66). The plurality of ECUs 10 to 40 are configured to control the controlled targets 51 to 66. Note that the ECU represents an electronic control unit. The controllers 50, 55, 60, and 65 may correspond to a first vehicle control device. The ECUs 10, 20, 30, and 40 may correspond to a second vehicle control device.

The various controllers 50 to 65 include, for example, an engine controller 50, a light controller 55, a horn controller 60, and a power source controller 65. The controlled targets 51 to 66 include, for example, an engine 51, various lights 56, a horn 61, and a generator 66.

The engine controller 50 has a function of controlling the engine 51 by driving actuators such as valves and motors included in the engine 51 in accordance with commands received from the calculation units 17 and 27, which will be described later. The light controller 55 has a function of controlling the various lights 56 by driving actuators such as switches for turning on and off the various lights 56 in accordance with commands from the calculation units 17 and 27.

The horn controller 60 has a function of controlling the horn 61 by driving an actuator such as a switch for operating the horn 61 in accordance with commands from the calculation units 17 and 27. The power source controller 65 has a function of controlling the amount of power generated from the generator 66 (for example, excitation current, etc.) in accordance with commands from the calculation units 17 and 27.

The plurality of ECUs 10 to 40 include a well-known microcomputer having CPUs 11, 21, 31, and 41 (hereinafter referred to as 11 to 41), and semiconductor memories 12, 22, 32, and 42 (hereinafter referred to as memories 12 to 42) such as RAM, ROM, and flash memory, respectively. The plurality of ECUs 10 to 40 include communication units 13, 23, 33, and 43 (hereinafter referred to as 13 to 43) for communicating with other ECUs 10 to 40 and various controllers 50 to 65 via the communication line 5, respectively.

Various functions of the plurality of ECUs 10 to 40 are implemented by the CPUs 11 to 41 executing programs stored in a non-transitional tangible storage medium. In this example, the memories 12 to 42 correspond to a non-transitory tangible storage medium storing the program. Further, by executing this program, a method corresponding to the program is executed. Note that the non-transitory tangible storage medium means a storage medium that does not use electromagnetic waves. Further, the number of microcomputers constituting a plurality of the ECUs 10 to 40 may be one or more.

Here, as an example, FIG. 2 shows functional configurations of the ECU 10 and the ECU 20 that are implemented by the CPUs 11 and 21 executing programs. Note that although the description of the ECUs 30 and 40 is omitted, they may have the same functions as the ECU 10 and the ECU 20.

As shown in FIG. 2, the functional configurations of the ECU 10 and the ECU 20 include a plurality of applications 15A, 15B, 25A, and 25B (hereinafter referred to as 15 and 25), the API unit 6, and a plurality of control programs 190 and 290, respectively.

The plurality of applications 15 and 25 are programs for providing services to vehicle users. The plurality of applications 15 and 25 indirectly transmit commands to the controlled targets 51 to 66 and operate the controlled targets 51 to 66 to provide useful functions to the user.

More specifically, the plurality of applications 15 and 25 are configured to generate a first command that does not specify the control IFs 19 and 29 for the control programs 190 and 290. Note that "commands" refer to instructions, commands such as arguments, function calls, etc. among data used by the control programs 190 and 290.

Note that the plurality of the applications 15 and 25 are not programs created specifically for vehicle types, grades, and the like, but are general-purpose programs that can support many vehicle types, grades, and the like. Accordingly, the plurality of applications 15 and 25 cannot specify how the vehicle in which they are installed controls the controlled targets 51 to 66. Therefore, the applications 15 and 25 output commands that do not specify the control amounts of the controlled targets 51 to 66, in other words, the control IFs 19 and 29 used by the control programs 190 and 290. On the other hand, the plurality of applications 15 and 25 generate desired abstract operation contents. For example, the operation contents of the plurality of applications 15 and 25 only include lighting, but do not include specifically determining the lighted target.

The plurality of control programs 190 and 290 are different from the plurality of applications 15 and 25, and are programs created specifically for vehicle types, grades, and the like. The plurality of control programs 190, 290 are provided with a plurality of control IFs 19A, 19B, 29A, 29B (hereinafter referred to as 19, 29) for exchanging a plurality of commands. The plurality of control IFs 19 and 29 of this embodiment each handle only one command.

The control programs 190 and 290 are programs for controlling the controlled targets 51 to 66, and, for example, calculate operating amounts of actuators included in the controlled targets 51 to 66, and transmit commands including the operation amounts to the various controllers 50 to 65. Note that the control programs 190 and 290 may be placed in various controllers 50 to 65 to which commands are output.

The API unit 6 is a program that functions as an API (Application Programming Interface) for matching commands handled by the plurality of applications 15 and 25 and commands handled by the plurality of control programs 190 and 290. The API unit 6 includes a plurality of input units 16A, 16B, 26A, 26B (hereinafter referred to as 16, 26), a plurality of calculation units 17, 27, and a plurality of output units 18A, 18B, 28A, 28B (hereinafter referred to as 18, 28). The input units 16A, 16B, 26A, 26B may correspond to a second input unit.

In the example shown in this embodiment, the API unit 6 is arranged across the plurality of ECUs 10 and 20. Note that the API unit 6 may be arranged in a single ECU 10 to 40. The plurality of input units 16 and 26 are programs that have a function of accepting commands from applications 15 and 25.

The plurality of calculation units 17 and 27 have a function of selecting one of the plurality of output units 18 and 28 to transmit a command. In other words, the plurality of calculation units 17, 27 select the output units 18, 28 necessary for implementing the first command. Further, the plurality of calculation units 17 and 27 have a function of communicating with the other ECUs 10 to 40 and generating a second command (or intermediate command in the present disclosure) in cooperation with the other ECUs 10 to 40. However, the plurality of calculation units 17 and 27 do not necessarily need to be configured to generate the second command, and may be configured to extract a second command set in advance according to the first command. In addition, the plurality of calculation units 17 and 27 have a function of causing the selected output units 18 and 28 to transmit the generated second command or the read second command.

The first commands output by the applications 15 and 25 are commands that do not specify the control IFs 19 and 29, as described above. On the other hand, the second command is a command corresponding to the first command, and is a command that specifies the control IFs 19 and 29. The second command is a command for identifying the controlled target and transmitting control contents to the controlled target.

The plurality of output units 18 and 28 are provided for the plurality of control IFs 19 and 29, respectively, and are configured to output input commands to the corresponding control IFs 19 and 29. That is, the plurality of output units 18 and 28 are arranged in a one-to-one relationship with the plurality of control IFs 19 and 29.

Note that each of the plurality of control IFs 19 and 29 can handle a plurality of commands. In the example below, the control IFs 19 and 29 receive commands for individually controlling multiple types of lights for each type of light. However, the output units 18 and 28 may be arranged for each command handled by the control IFs 19 and 29.

(1-2. First Operation Example)

As a first operation example using the above configuration, a process of activating various lights 56 due to the operation of the application 15 will be described with reference to FIG. 3. The application 15A generates commands for the various lights 56, for example, according to a value of illuminance obtained from an illuminance sensor (not shown).

Specifically, as shown in FIG. 3, first, the application 15A generates a command to turn on the light by executing a process corresponding to the application 15A. This command corresponds to the first command in the present disclosure, and is a command that does not specify the control IFs 19 and 29. The first command only needs to include, for example, one abstract command such as "turn on the light". The first command does not need to include a command specifying a specific object to be controlled, such as specifying which light is to be turned on or a device whose operation is to be stopped when a light is turned on.

A command to turn on the light from the application 15A is input to the input unit 16A, and the calculation unit 17 performs calculations necessary to implement the command to turn on the light. Note that in FIG. 3, the input unit 16A and the calculation unit 17 are illustrated as one element.

The calculation unit 17 performs necessary calculations such as selecting the output units 18 and 28 to output the command, generating the second command, and causing each selected output unit 18 and 28 to transmit the second command to the control IF 19 and 29. The second command is a command corresponding to the first command, and includes control details for the controlled targets 51 to 66 based on the first command. The control content here may be abstract, such as specifying a control target, turning on or off a specific light, or turning on a specific light at a predetermined brightness. This is because the control programs 190 and 290 calculate the specific control content, such as selecting the operated actuator and determining the control amount for the operation.

In the example of FIG. 3, the calculation unit 17 selects, for example, the output unit 18A as the output unit 18, 28 that output the command. Then, as a second command, a command to turn off the high beam, tail lamp, clearance lamp, panel lamp, daytime running light, and rear fog lamp among the various lights 56, and a command to turn on the low beam and front fog lamp are generated. That is, the calculation unit 17 generates a plurality of second commands for the selected output units 18 and 28 based on one first command.

Note that the calculation unit 17 may also include the priority of the second command in the command. The priority is associated in advance depending on the type of the second command, for example. For example, a command to turn on a light is associated in advance with "low", which has a relatively low priority. Note that the priority includes, for example, "high" which is a relatively high priority, "low" which is a relatively low priority, and "medium" which is an intermediate priority between "high" and "low", and the second command is transmitted with one of these priorities associated with it.

Next, the calculation unit 17 instructs the selected output unit 18A to transmit the second command to the control IF 19A by transmitting the second command to the selected output unit 18A. The output unit 18A receives the second command and transfers the second command to the control IF 19A. In this case, the output unit 18A transmits a plurality of second commands for controlling a large number of lights to the control IF 19A.

Note that the control program 190 calculates a specific amount of actuator operation, etc. based on the second command, and transmits the calculation result to the light controller 55. Further, the light controller 55 may perform the calculation of the operating amount and the like. The light controller 55 operates various lights 56 in response to the operating amount and the like.

(1-3. Second Operation Example)

Next, as a second operation example using the above configuration, a process of operating the various lights 56 and horn 61 due to the operation of the application 15 will be described with reference to FIG. 4. The application 15A in this operation example executes the process, for example, when receiving an instruction to execute a car finder, which is a function to help the user to find its own vehicle while the vehicle is parked.

Figure 4:
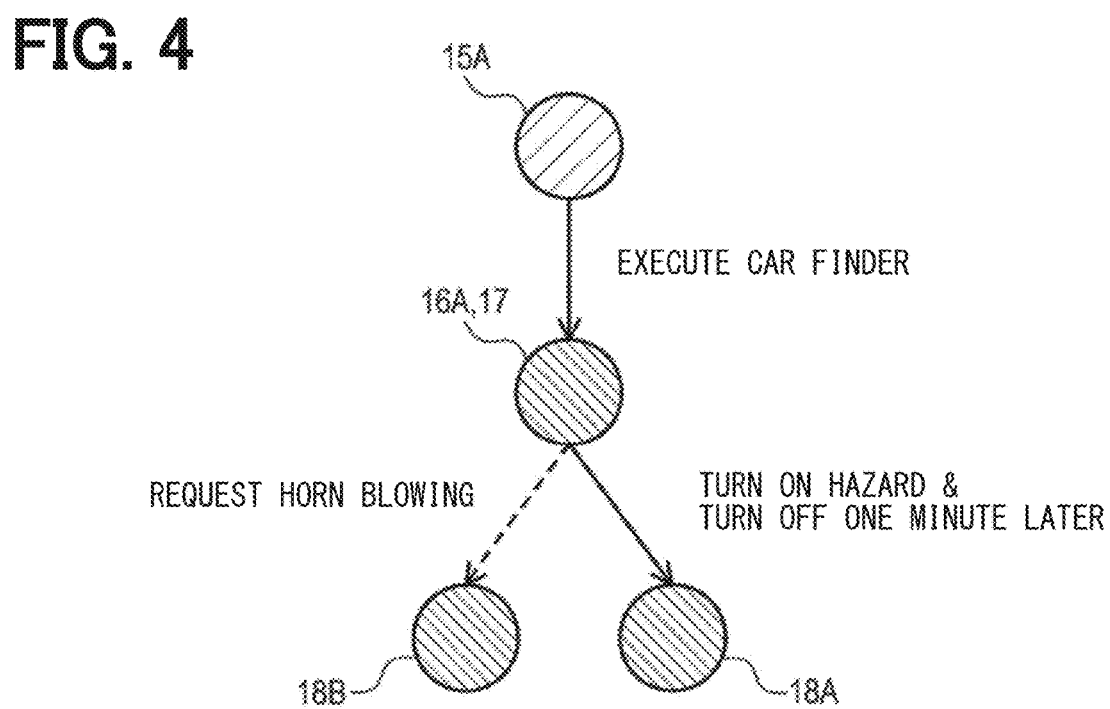
FIG. 4 is an explanatory diagram showing a processing procedure in a second operation example.

When the application 15A determines that the function of the car finder should be executed on the program, as shown in FIG. 4, the application 15A transmits a command to execute the car finder to the input unit 16A. The command to execute the car finder corresponds to the first command of the present disclosure.

A command to execute the car finder is input to the input unit 16A, and the calculation unit 17 performs calculations necessary to implement the command to execute the car finder. The calculation unit 17 selects a plurality of output units 18A and 18B, for example, as shown in FIG. 4. This is because there are two types of commands corresponding to the control IFs 19 and 29 to which the commands should be sent. The output unit 18A corresponds to the control IF 19A for the various lights 56, and the output unit 18B corresponds to the control IF 19B for the horn 61, for example.

The calculation unit 17 generates, as a second command to be sent to the output unit 18A, a command to turn on the hazard lamp and turn it off after one minute. Further, the calculation unit 17 generates a horn blowing request as a second command to be sent to the output unit 18B. That is, the calculation unit 17 is configured to select a plurality of output units 18, 28 based on one first command, and generate the second command for each of the selected output units 18, 28.

Next, the calculation unit 17 causes the selected output units 18A and 18B to transmit the second command. The output units 18A and 18B receive the second command and transfer the second command to the control IF 19A. In this case, the output unit 18A transmits a second command for controlling the hazard lamp to the control IF 19A, and the output unit 18B transmits the second command for controlling the horn 61 to the control IF 19B.

(1-4. Third Operation Example)

Figure 5:
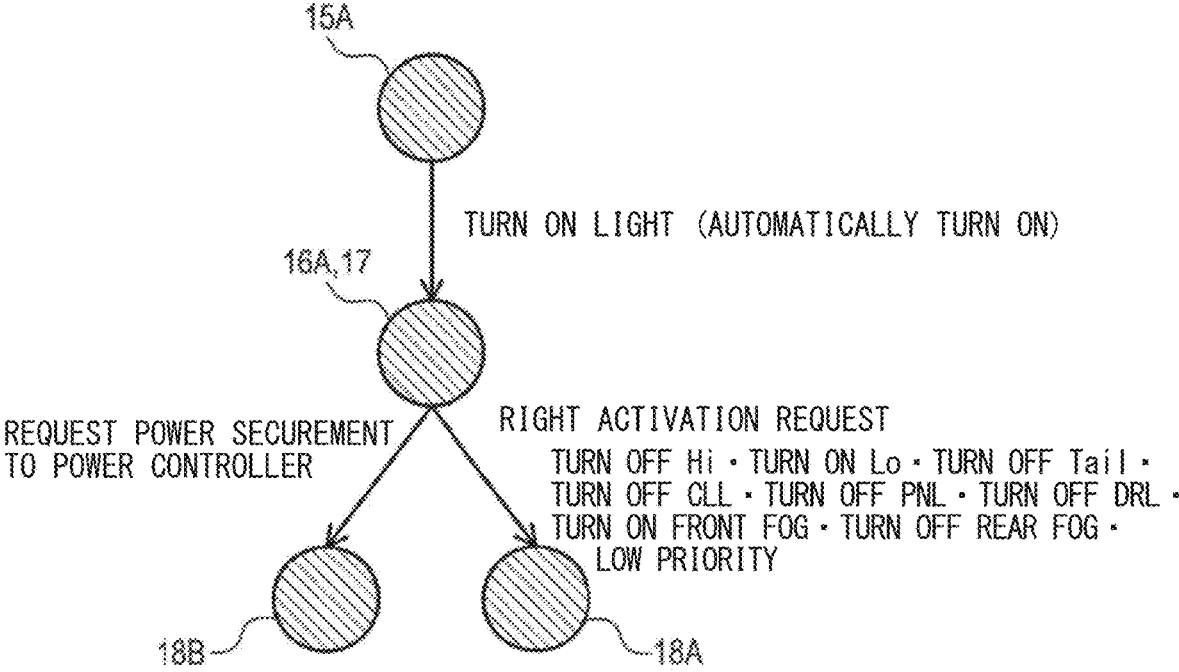
FIG. 5 is an explanatory diagram showing a processing procedure in a third operation example.

Next, a third operation example using the above configuration will be described using FIG. 5. The third example of operation is largely similar to the first example of operation. However, the difference is that the calculation unit 17 selects the output unit 18B in addition to the output unit 18A, and that the calculation unit 17 generates and transmits a power reservation request as the second command to the output unit 18B.

That is, the calculation unit 17 generates a command to increase the amount of power generated by the power generator 66 as a second command to the output unit 18B, and transmits this second command to the output unit 18B. The control program 190 receives the second command, generates a control amount for the generator 66, and transmits an instruction based on the control amount to the power source controller 65. Then, the amount of power generated by the generator 66 corresponding to the instruction is ensured.

(1-5. Fourth Operation Example)

Figure 6:
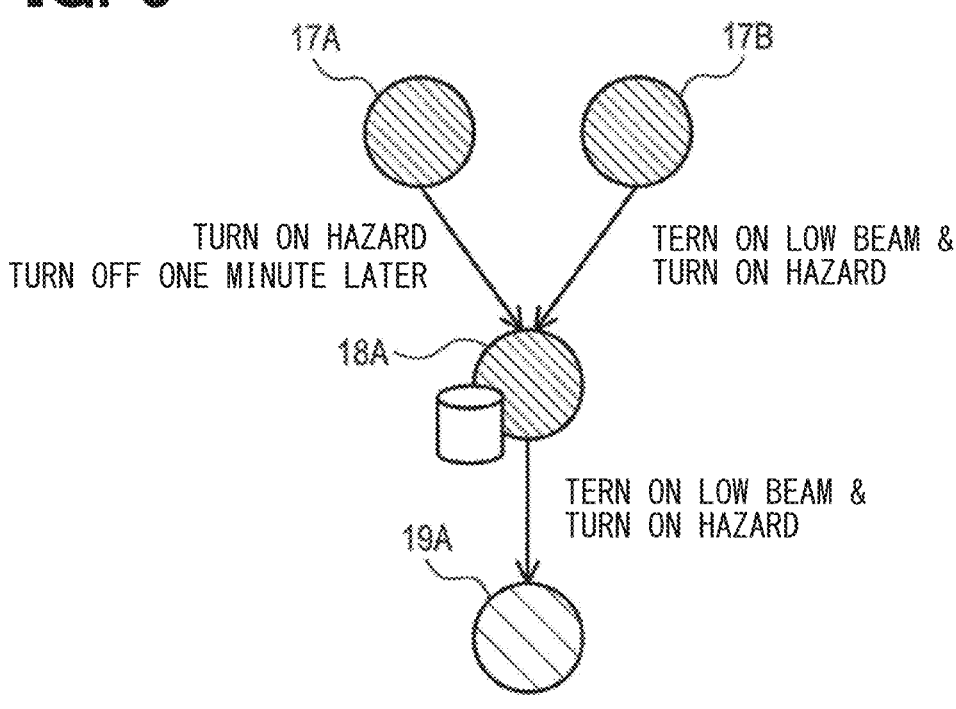
FIG. 6 is an explanatory diagram showing a processing procedure in a fourth operation example.

The calculation unit 17 includes a plurality of functions for generating the second command. In FIG. 6, the plurality of functions for generating the second command are referred to as a first calculation unit 17A and a second calculation unit 17B.

The first calculation unit 17A generates, as the second command, a command to turn on the hazard lamp and turn it off after one minute. Further, the second calculation unit 17B generates, as the second command, a command to turn on the low beam and turn on the hazard lamp. These second commands are transmitted to the same output unit 18A selected as the output destination.

Here, the output unit 18A may receive competing commands that are overlapping commands or contradictory commands. Therefore, the output unit 18A is configured to arbitrate the plurality of second commands when receiving the plurality of second commands generated by the plurality of calculation units 17 and 27. The arbitration refers to a process of determining whether to accept individual second commands, setting the priority of processing order, processing the waiting time, etc. when accepting the plurality of second commands and executing processing. The arbitration may also include ignoring overlapping processing. Note that the output units 18 and 28 perform arbitration according to rules set in advance for each of the plurality of second commands that may be input. At this time, the priority order included in the second command may be used.

The output units 18 and 28 are configured to selectively output the plurality of second commands to the control IFs 19 and 29 based on the result of the arbitration. That is, the output units 18 and 28 may select a plurality of second commands and output only the selected second command to the control IFs 19 and 29.

In the configuration of the fourth operation example, the output unit 18A, as arbitration, ignores one of the commands to turn on the hazard lamp received from both the first calculation unit 17A and the second calculation unit 17B, and executes a process of accepting all of the non-overlapping commands. Then, the output unit 18A transmits the second command after arbitration to the control IF 19A.

(1-6. Sixth Operation Example)

Figure 7:
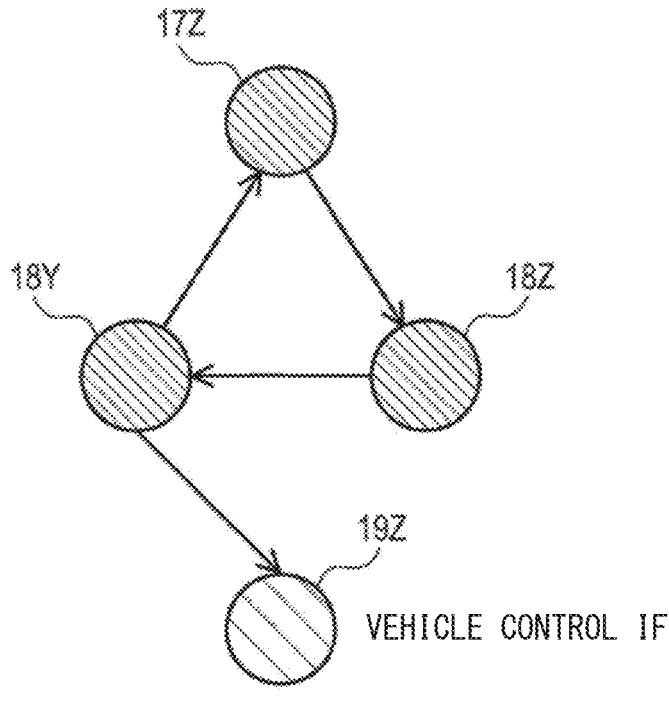
FIG. 7 is an explanatory diagram showing a processing procedure in a reference example.

In a configuration of a reference example shown in FIG. 7, a command is transmitted from an upper layer calculation unit 17Z to a lower layer output unit 18Z, and further, a command is transmitted to another output unit 18Y in the same layer. Furthermore, the command is transmitted from this output unit 18Y to the calculation unit 17Z in the upper layer.

Figure 8:
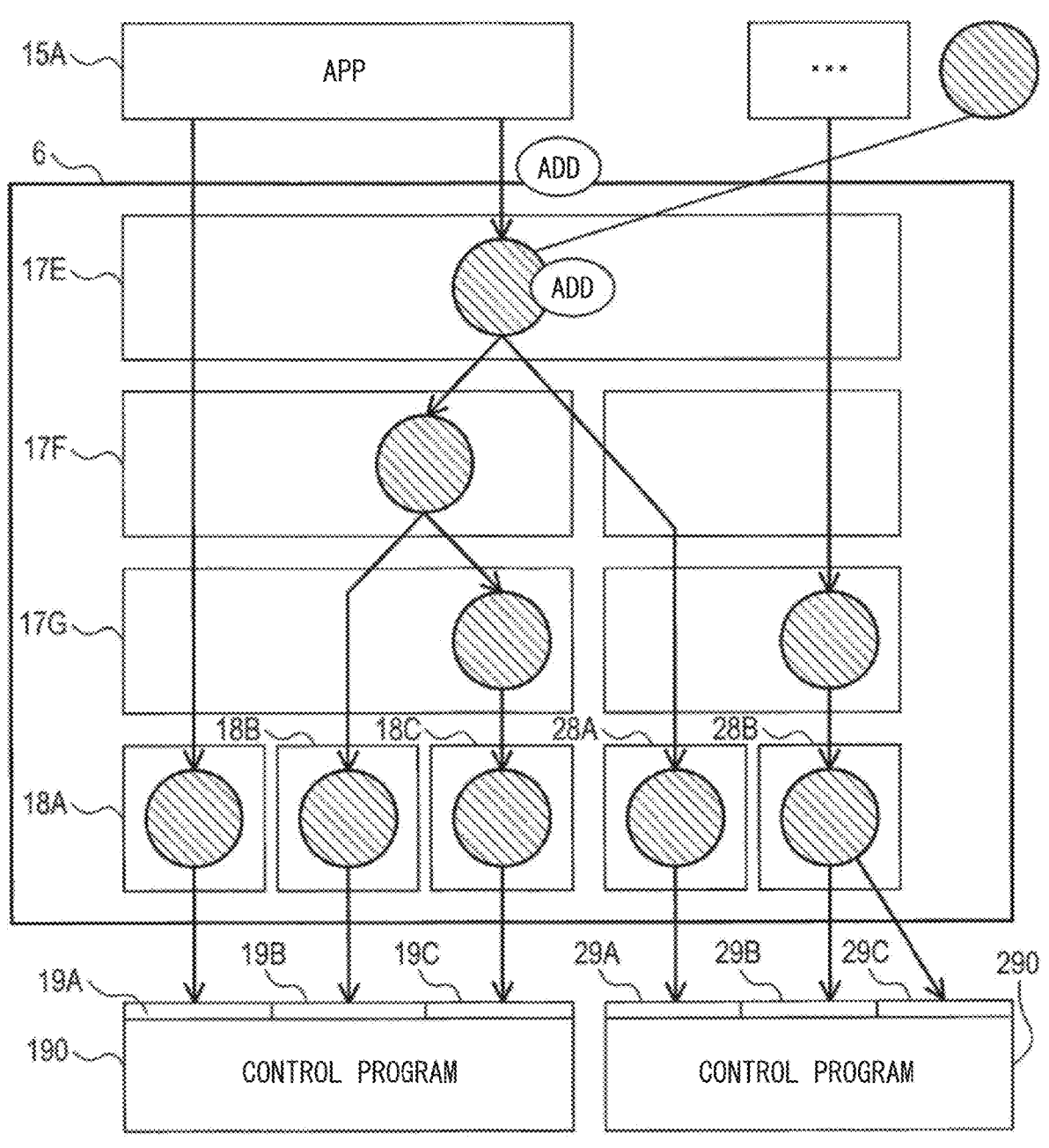
FIG. 8 is an explanatory diagram showing a processing procedure in a fifth operation example.

In other words, there is a possibility that the commands are looped between the calculation unit 17Z and the output units 18Y and 18Z, resulting in an infinite loop. On the other hand, in the configuration of the fifth operation example, as shown in FIG. 8, the configuration of the API unit 6 is hierarchical, and commands are transmitted sequentially in one direction from the upper layer to the lower layer. Note that not only the fifth operation example but also the API unit 6 of the first to fourth operation examples are similarly hierarchical.

Specifically, as shown in FIG. 8, a layer close to the application 15 is the upper layer, and a layer close to the control program 190, 290 is the lower layer. The API unit 6 has, in order from the top layer, an inter vehicle control composite layer 17E, a vehicle control interior composite layer 17F, a simplification layer 17G, and output units 18 and 28. In addition, in FIG. 8, the functions of the calculation unit 17 are further divided, and thereby the inter vehicle control composite layer 17E, the vehicle control interior composite layer 17F, and the simplification layer 17G are displayed. Further, the output units 18 and 28 are provided with an output unit 18C, and the control IFs 19 and 29 are provided with a control IF 19C corresponding to the output unit 18C.

Any one of the layers 17E, 17F, and 17G includes one or more of the functions included in the calculation unit 17. Further, although illustration of the input units 16 and 26 is omitted, the input units 16 and 26 are located in a layer higher than the inter vehicle control composite layer 17E.

The inter vehicle control composite layer 17E is the first layer, that is, the top layer in FIG. 8, and provides an abstracted API that spans multiple domains related to vehicle control. For example, when the inter vehicle control layer 17E receives a request from an application using the abstract API called "driver awakening" to wake up a drowsy driver, it has a function of executing the following control. For example, the inter vehicle control composite layer 17E executes controlling steering vibration and sound volume to be "larger (that is, changed to a higher volume)" and air conditioner's cold air to be "stronger (that is, change to a higher air volume)." In other words, it is control that spans the HMI domain and the body domain. Further, the inter vehicle control complex layer 17E has a function of performing arbitration that spans domains and is related to the vehicle control. For example, when a control request for turning on the lights or turning on the air conditioner is received, the remaining battery level is referred to and whether the control request can be executed is determined based on whether the remaining battery level is sufficient. In other words, it is an arbitration that spans the body domain and the power source domain.

The vehicle control interior composite layer 17F is the second layer in FIG. 8, that is, the second layer from the top layer, and provides an abstract API within one domain of vehicle control. For example, it provides an abstract API called "light on in auto mode". Further, the vehicle control interior composite layer 17F performs arbitration within the vehicle control domain. For example, when requests for "light on in auto mode" and "passing" occur at the same time, the control content is determined. Both are abstract APIs within the body system domain, and are arbitration within the body system domain.

The simplification layer 17G is the third layer in FIG. 8, that is, the third layer from the top layer, and has a function of hiding detailed parameters of the vehicle control. In other words, the simplification layer 17G is configured to determine the control amount of vehicle control or the order of vehicle control. For example, a parameter specified as "High/Mid/Low" by the abstraction API is converted into a specific control amount (for example, torque value). Further, for example, when "blinking for 10 seconds" is specified, processing such as repeating "ON, OFF, standby for 1 second" is executed.

The output units 18 and 28 are layers also called base layers, and are the fourth layer in FIG. 8, that is, the fourth layer from the top layer. The output units 18 and 28 are configured in one-to-one correspondence form with the control IFs 19A to 19C and 29A to 29C for controlling the sensors and actuators and the APIs provided by the ECUs 141 to 148.

As shown in FIG. 8, data handled in each layer 17E, 17F, 17G, and 18 is set so that it is passed only to the lower layer in one direction, and is not passed to the same layer or upper layer.

In this configuration, for example, when adding a new application 15 to the vehicle control system 1, the inter vehicle control composite layer 17E (in addition, the input unit 16) may be added or changed so as to be compatible with the layers below the vehicle control interior composite layer 17F of the API unit 6.

In other words, it is possible to add the application 15 without changing the control programs 190 and 290 by keeping the part affected by the addition of the application 15 to only a part of the API unit 6.

(1-7. Effect)

The above-described embodiment provides the following effects.

(1a) One aspect of the present disclosure is the ECUs 10 to 40 that are located in the vehicle and configured to control the controlled targets 51 to 66 by transmitting a command to the control program 190, 290 for controlling the controlled targets 51 to 66. The control programs 190, 290 include a plurality of control IFs 19, 29 for exchanging commands. The ECUs 10 to 40 include at least one application 15, 25, a plurality of output units 18, 28, and at least one calculation unit 17, 27.

More specifically, the plurality of applications 15 and 25 are configured to generate a first command that does not specify the control IFs 19 and 29 for the control programs 190 and 290. The output units 18 and 28 are provided at least for each of the plurality of control IFs 19 and 29, and are configured to output input commands to the corresponding control IFs 19 and 29.

The calculation units 17 and 27 are configured to select the output unit 18 and 28 to transmit the command from among the plurality of output units 18 and 28 based on the first command. Further, the calculation units 17 and 27 generate or extract for each selected output unit 18 and 28 the second command that corresponds to the first command and represents a command to be transmitted from the selected output unit 18 and 28. The calculation units 17, 27 are configured to cause each of the selected output unit 18 and 28 to transmit the second command to the control IFs 19 and 29. Each of the plurality of output units 18, 28 is configured such that only one output unit 18, 28 transmits the second command to the control IF 19, 29 for each of the plurality of control IFs 19, 29.

According to such a configuration, the plurality of output units 18, 28 are provided for each of the plurality of control IFs 19, 29, respectively. Therefore, when changing the applications 15, 25, it is only necessary to change the configuration of the calculation units 17, 27, and there is no need to change the control programs 190, 290. Therefore, it is possible to further narrow the range of programs to be modified.

(1b) In one aspect of the present disclosure, the hierarchy order of the applications 15, 25, the calculation units 17, 27 (second command unit), the output units 18, 28 is the applications 15, 25, the calculation units 17, 27, the output units 18, 28. In one aspect of the present disclosure, commands are configured to be transmitted in one direction according to the order of this hierarchy.

According to such a configuration, the flow of commands from the applications 15, 25 to the control programs 190, 290 can be made unidirectional. Therefore, it is possible to prevent the process in the applications 15, 25, the calculation units 17, 27, and the output units 18, 28 from becoming an infinite loop.

(1c) In one aspect of the present disclosure, at least the calculation units 17 and 27 are configured to generate the second command in cooperation with the other ECUs 10 to 40 while communicating with the other ECUs 10 to 40. According to such a configuration, since the ECU 10 cooperates with other ECUs 10 to 40 and processes are distributed, it is possible to reduce the processing load on each ECU 10 to 40.

(1d) In one aspect of the present disclosure, the plurality of calculation units 17 and 27 are provided. The output units 18, 28 (arbitration unit) are configured to arbitrate between the plurality of second commands when any of the plurality of output units 18, 28 receives the plurality of second command generated by the plurality of calculation units 17, 27. The output units 18 and 28 are configured to selectively output the plurality of second commands to the control IFs 19 and 29 based on the result of the arbitration.

According to such a configuration, when the plurality of second commands are input to the output units 18 and 28, the plurality of second commands are arbitrated and then selectively output to the control IFs 19 and 29. Accordingly, even when the competing second commands are input to the output units 18 and 28, it is possible to satisfactorily output the second command.

(1e) In one aspect of the present disclosure, the calculation units 17, 27 is configured to select a plurality of output units 18, 28 based on one first command, and generate the second command for each of the selected output units 18, 28.

According to such a configuration, the second commands for the plurality of output units 18 and 28 are generated based on one first command, so there is no need to prepare the plurality of first commands, and it is possible to more abstract the first command.

(1f) In one aspect of the present disclosure, the calculation units 17 and 27 are configured to generate the plurality of second commands to the selected output units 18 and 28 based on one first command. According to such a configuration, the plurality of second commands for the selected output units 18, 28 are generated based on one first command, so there is no need to prepare the plurality of first commands. It is possible to more abstract the first command.

2. Other Embodiments

Although the embodiment of the present disclosure has been described above, the present disclosure is not limited to the above-described embodiments, and various modifications can be made.

(2a) In the above embodiment, the configuration has been described in which the controlled targets 51 to 66 include the engine 51, various lights 56, the horn 61, and the generator 66, but the present disclosure is not limited to this. For example, in a configuration including brakes, meters, audio equipment, etc., the ECUs 10 to 40 may be configured to control these.

(2b) In FIG. 3 etc., the calculation unit 17 generates and transmits the plurality of second commands to the selected output units 18 and 28 based on one first command, the calculation unit 17 may sequentially transmit the plurality of second commands. The order and timing of transmitting the plurality of second commands may be set in advance. Further, the calculation unit 17 may transmit a plurality of second commands in an order according to a preset priority order.

(2c) As shown in FIG. 4, when the calculation unit 17 selects the plurality of output units 18A, 18B based on one first command and transmits the second command to these output units 18A, 18B, the plurality of second commands may be transmitted in an order according to a preset priority order.

(2d) In the above embodiment, one output unit 18, 28 is configured to transmit a command to one control IF 19, 29. However, the configuration is not limited to this. For example, as shown in FIG. 8, one output unit 28B may be configured to transmit commands to the plurality of control IFs 29B and 29C.

(2e) Specifically, the interface in the present disclosure includes the entire configuration (for example, multiple control IFs 19 and 29) that can handle multiple commands, and a configuration (for example, a part of the plurality of control IFs 19 and 29) that handles only one type of command.

According to these configurations, each of the plurality of output units 18, 28 may be configured such that only one output unit 18, 28 transmits the second command to the control IF 19, 29 for each of the plurality of control IFs 19, 29. The control IFs 19A to 19C and 29A to 29C correspond to a first input unit in the present disclosure.

Figure 9:
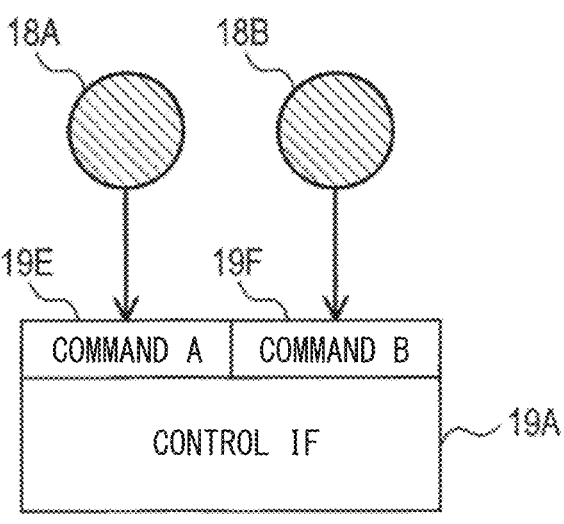
FIG. 9 is an explanatory diagram showing destinations to which commands are transmitted by the output unit in another embodiment.

Further, regarding each of the plurality of output units 18 and 28, only one output unit 18, 28 that transmits the second command to a reception unit may be provided for each reception unit that receives the command handled by the plurality of control IFs 19 and 29. Specifically, as shown in FIG. 9, a case will be described in which the control IF 19A that handles commands A and B, a reception unit 19E that receives the command A, and a reception unit 19F that receives the command B will be described. The reception units 19E and 19F correspond to the first input unit in the present disclosure.

As shown in FIG. 9, the reception unit 19E is configured to receive instructions only from the output unit 18A, and the reception unit 19F is configured to receive instructions only from the output unit 18B. In other words, the relationship between the number of control IFs 19 and 29 and the number of output units 18 and 28 is one-to-many, but a relationship between the number of commands handled by control IFs 19 and 29 (for example, the number of reception units) and the number of output units 18 and 29 is set on a one-to-one basis.

(2-1. First Modification)

Figure 10:
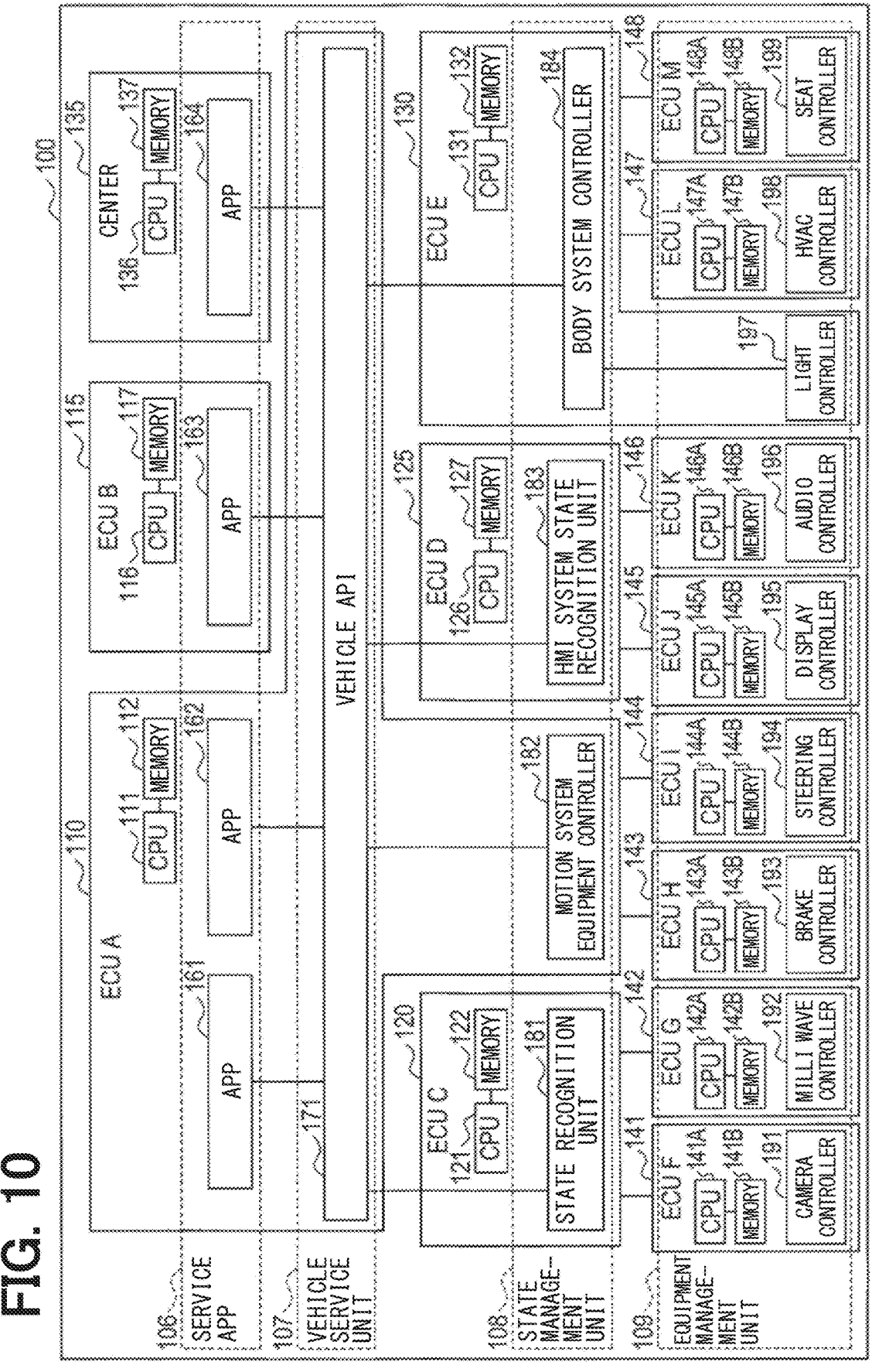
FIG. 10 is a block diagram showing an example of the hardware configuration of a vehicle control system in another embodiment.

The above-described configuration can be implemented as, for example, a specific configuration as shown in FIG. 10. A vehicle service unit 107 shown in FIG. 10 has a function corresponding to the above-described inter vehicle control composite layer 17E, and a state management unit 108 has functions corresponding to the above-described vehicle control interior composite layer 17F, the simplification layer 17G, and the output units 18 and 28.

The vehicle control system 100 shown in FIG. 10 is mostly mounted on a vehicle and includes a plurality of ECUs 110, 115, 120, 125, 130, 141 to 148 (hereinafter referred to as a large number of ECUs 110, etc.). The vehicle control system 100 may include a center 135 outside the vehicle.

The center 135 is configured as a server capable of providing a function to the vehicle. For example, the center 135 can provide the vehicle with a function related to automated driving. The large number of ECUs 110 and the like and the center 135 each mainly include a known microcomputer having CPUs 111, 116, 121, 126, 131, 136 (hereinafter referred to as CPUs 111 to 136) and semiconductor memories 112, 117, 122, 127, 132 and 137 (hereinafter referred to as memories 112 to 137) such as RAM, ROM, and flash memory. Further, the ECUs 141 to 148 include CPUs 141A, 142A, 143A, 144A, 145A, 146A, 147A, 148A, and memories 141B, 142B, 143B, 144B, 145B, 146B, 147B, 148B, respectively.

A large number of the ECUs 110 and the like and the center 135 are configured to control a control target mounted on the vehicle. The control target corresponds to, for example, an actuator such as an engine, a brake, a motor, various lights, a display device, an air conditioner, a seat, a horn, or a power generator, or a sensor such as a camera or a millimeter wave. Note that illustration of the control target is omitted.

The controlled targets are individually controlled by the ECUs 141 to 148 which are operation control devices. The ECUs 141 to 148 include an ECUF 141 including a camera controller 191, an ECUG 142 including a millimeter wave controller 192, an ECUH 143 including a brake controller 193, and an ECUI 144 including a steering controller 194. Further, the ECUs 141 to 148 also include an ECUJ 145 including a display controller 195, an ECUK 146 including a sound controller 196, an ECUL 147 including an HVAC controller 198, and an ECUM 148 including a seat controller 199.

Each of the controllers 191 to 199 includes an operation control program for operating a control target. The camera controller 191 acquires a captured image of an in-vehicle camera and controls exposure and the like of the in-vehicle camera. The millimeter wave controller 192 controls a millimeter wave radar provided in the vehicle and acquires a detection result obtained by the millimeter wave radar.

The brake controller 193 controls a brake. The steering controller 194 controls steering. The display controller 195 controls an indicator such as a meter or a warning light. The sound controller 196 controls a sound such as a warning sound and a voice generated from a speaker. A light controller 197 controls various lights mounted on the vehicle. Note that the light controller 197 is included in the ECUE 130.

The HVAC controller 198 controls an in-vehicle air conditioner. Note that HVAC is an abbreviation for Heating Ventilation and Air-Conditioning. The seat controller 199 controls an electric power seat of the vehicle.

Various functions of a large number of the ECUs 110 and the center 135 are implemented by the CPUs 111 to 131 executing a program stored in a non-transitory tangible storage medium. In this example, the memories 112 to 132 correspond to the non-transitory tangible storage medium storing the program. Further, by executing this program, a method corresponding to the program is executed. Note that the non-transitory tangible storage medium means a storage medium that does not use electromagnetic waves. Furthermore, the number of microcomputers constituting a large number of the ECUs 110 and the like and the center 135 may be one or more.

Among a large number of ECUs 110 and the like, the ECUA 110 executes a program to implement functions as applications 161 and 162 (hereinafter, apps 161, 162), a vehicle API 171, and a motion system equipment controller 182. An ECUB 115 implements a function as an application 163. The center 135 implements a function as an application 164.

The applications 161 to 164 are programs for providing a service to a user of the vehicle. The applications 161 to 164 indirectly transmit a command to the control target and provide a useful function to the user by operating the control target. These applications 161 to 164 may be installed in the ECUA 110, the ECUB 115, or the center 135.

More specifically, the applications 161 to 164 are configured to generate a first command that is a command not directly designating the controllers 191 to 199 to be described later for the vehicle API 171. Note that the "command" includes a command such as an operation request, a command such as an argument, and a function call among data used by the vehicle API 171. The "command" may include priority information indicating which command is to be preferentially processed.

The applications 161 to 164 are not programs created specifically for vehicle types, grades, and the like, but are general-purpose programs that can support many vehicle types, grades, and the like. Thus, the applications 161 to 164 cannot specify how the vehicle in which the applications are installed controls the control target. Therefore, the applications 161 to 164 output a specific control amount of the control target, in other words, a command not designating the controllers 191 to 199 used by the vehicle API 171. On the other hand, the applications 161 to 164 generate a desired abstract operation content. For example, the operation content instructed by the applications 161 to 164 includes only turning on the light in an auto mode, and the specifically, does not include determining the light to be turned on.

Hereinafter, at least one of the applications 161 to 164 is also referred to as a service application 106. Unlike the applications 161 to 164, the vehicle API 171 is a program created specifically for a vehicle type, a grade, and the like. That is, the vehicle API 171 is a program that absorbs differences in vehicle type, grade, and the like such that the applications 161 to 164 do not need to recognize the differences in vehicle type, grade, and the like. The vehicle API 171 is a program that functions as an API for adapting a command used by the applications 161 to 164 and a command used by the state management unit 108 and an equipment management unit 109 to be described later. Note that API is an abbreviation for Application Programming Interface.

The vehicle API 171 is installed in the ECUA 110. The vehicle API 171 receives commands from a plurality of the applications 161 to 164 installed in the ECUA 110 that is the vehicle API 171, the ECUB 115 that is another ECU, and the center 135.

Hereinafter, at least one of the vehicle APIs 171 is also referred to as a vehicle service unit 107. Note that the vehicle service unit 107 may include a plurality of vehicle APIs. Here, the ECUC 20 implements a function as a state recognition unit 181. The ECUD 25 implements the function of the HMI system status recognition unit 183. The ECUE 130 implements a function as a body system controller 184. Hereinafter, at least one of the state recognition unit 181, the motion system equipment controller 182, the HMI system state recognition unit 183, or the body system controller 184 is also referred to as the state management unit 108. The state recognition unit 181, the motion system equipment controller 182, the HMI system state recognition unit 183, and the body system controller 184 correspond to the domains of the state recognition, the motion system, the HMI system, and the body system, respectively, and are functional units that integrate the ECUs belonging to the domains.

The state management unit 108 is one of programs for controlling a control target. The state management unit 108 calculates, for example, an operation amount of an actuator or a sensor that is a control target, and sends a command including the operation amount to the various controllers 191 to 199. That is, the state management unit 108 has a function of generating a second command embodying the first command when the abstracted first command is input. Note that the vehicle service unit 107 may have a function of generating the second command embodying the first command.

The state management unit 108 is also a program for sending data obtained from a sensor or an actuator to the service application 106. In other words, the state management unit 108 implements a function of "state recognition" and a function of "equipment control". The function of the state recognition converts sensor data obtained from the equipment management unit 109 (each of the controllers 191 to 199 to be described later) or data obtained by an actuator into a format suitable for the vehicle service unit 107, and transmits it to the vehicle service unit 107. In the function of the equipment control, a drive instruction from the vehicle service unit 107 is distributed to the equipment management unit 109.

The state management unit 108 may be installed in the same ECUA 110 as the vehicle API 171, or may be installed in the ECUC 120, ECUD 125, or ECUE 130 that is another ECU. The state recognition unit 181, the motion system equipment control unit 182, the HMI system state recognition unit 183, and the body system controller 184, which are the state management unit 108, may all be installed in the same ECUA 110 as that of the vehicle API 171. Alternatively, it may be distributed and installed in each ECU that controls each domain.

In the function of the state recognition, a function of classifying individual sensor raw data acquired by the equipment management unit 109 from the vehicle sensor into data for each sensing target is implemented so that the service application 106 easily uses the data. Furthermore, a function of integrating data, converting the data into information with a higher abstraction level, and transmitting the information to the vehicle service unit 107.

For example, in the function of the state recognition, each of the controller 191 to 199 constituting the equipment management unit 109 acquires pieces of information such as a vehicle speed of 0 km/h, a shift position P, and absence of a driver in the vehicle, and mainly focuses on that the vehicle is in a parked state on the basis of these pieces of information. This information is further transmitted to the service application 106 via the vehicle service unit 107.

For example, in a case where the service application 106 makes a request for a car finder, the vehicle service unit 107 may combine ack from a light and ack from a horn into one operation result and respond to the service application 106. Here, ack is a response to the control request of the light and the horn. Furthermore, the car finder is a function of an application that notifies the user of the position of the vehicle in a parking lot or the like in an easy-to-understand manner.

In the function of the equipment control, each of the controllers 191 to 199 (for example, an engine, a steering, a shift, a door, a window, an air conditioner, or the like) in the optimal equipment management unit 109 is selected in order to implement the vehicle operation request from the service application 106. Then, the format is converted into a format of data that can be received by each of the controllers 191 to 199, and the data is distributed in consideration of the order of transmission of the data.

For example, when the vehicle operation request is to "accelerate the vehicle at 0.3 G while turning the vehicle to the left with a radius of 200 m", "request for the engine to output 1000 Nm and request for the steering to output −0.1 rad" is output in the function of the equipment control.

Furthermore, for example, it is assumed that the vehicle operation request is "shift to a parking state". In this case, in the function of the equipment control, a "request for setting a shift to p, a request for an air conditioner to be off, a request for a window to be fully closed, a request for a door to be locked when the request described above is completed and there is no occupant, and a request for transition to a parking state" are output.

The state management unit 108 is divided into a plurality of programs for each type of vehicle operation corresponding to the type of first command. The type of vehicle operation includes, for example, a traveling system related to turning, running, and stopping of the vehicle, an HMI system related to information presentation to the user, a body system related to a state change of the body, and the like. As described above, in the state management unit 108, management functions 81 to 84 are provided according to the type of the domain, and the programs of the management functions are stored in the memory 122 of the ECUC 120, the memory 127 of the ECUD 125, the memory 132 of the ECUE 130, which are domain control units, or the memory 112 of the ECUA 110, which is an integrated ECU.

In other words, the state management unit 108 is classified not for each implementation means (for example, each of the controllers 191 to 199 or the like) that is likely to depend on vehicle variation but for each vehicle operation that is likely to be requested by the service application 106.

The state recognition unit 181 acquires information from the camera controller 191 and the millimeter wave controller 192, converts the information into information regarding the positions of the vehicle and the pedestrian, and outputs the information to the vehicle service unit 107. The motion system equipment controller 182 converts the operation request of the vehicle into control amounts of the brake controller 193 and the steering controller 194 and outputs the control amounts.

The HMI system state recognition unit 183 receives a command of a warning, determines whether to perform notification using the display controller 195 and the sound controller 196, and outputs the control amount. For example, the body system controller 184 receives a command related to the vehicle environment, determines which one of the light controller 197, the HVAC controller 198, the seat controller 199, and the like is to be operated, converts the command into an appropriate command, and outputs the command.

As described above, the architecture within the vehicle network is configured such that the first layer is the equipment management unit 109, the second layer is the state management unit 108, the third layer is the vehicle service unit 107, and the fourth layer is the service application 106.

Next, a basic process executed by the vehicle control system 100 will be described with reference to a flowchart of FIG. 11. Note that the process order of S10 and S20 can be changed arbitrarily.

The service application 106 transmits an operation request (that is, the first command in the present disclosure) to the vehicle service unit 107. On the other hand, as shown in FIG. 11, the vehicle service unit 107 determines in S110 whether there is an operation request from the service application 106, and repeats S110 until the operation request occurs. When the operation request occurs, the process moves to S10.

The vehicle service unit 107 performs operation request acceptance determination in S10. The operation request acceptance determination is a process of determining whether each of the controllers 191 to 199 can accept the first command.

For example, the vehicle service unit 107 interprets the abstracted API in S12, performs arbitration within vehicle control in S14, and determines whether the arbitration has been successful in S16. When the arbitration has been successful, the process proceeds to S20. When the arbitration has not been successful, the process proceeds to S150 (or S120).

In S10, the vehicle service unit 107 is configured to determine whether the first command can be accepted based on at least one of the vehicle equipment, the vehicle state, or the syntax of the command included in the first command. Note that the vehicle equipment and vehicle state indicate the equipment and state of the vehicle in which the vehicle control system 100 is installed.

In S10, the vehicle service unit 107 determines whether it can accept an operation request from the service application 106, based on, for example, the following six items.

<<1>> Syntax: Whether an error is in the API syntax on the program.

<<2>> Equipment information: Whether the vehicle is equipped with the controlled target required to operate.

<<3>> Operation possible level: Whether the equipment required to operate can currently accept operation requests.

<<4>> Authentication/Authorization: Whether the requesting service application 106 is authenticated, and whether it has the right to access the vehicle service unit 107.

<<5>> Abnormality in vehicle service unit 107: Whether an abnormality (for example, a data or communication abnormality, an operation outside normal specifications, and the like) has occurred in the vehicle service unit 107.

<<6>> Cache status: Whether, since the state management unit 108 determined that the command could not be accepted, a period of time for enabling acceptance of the command has elapsed.

Note that in <<3>>, the state of "equipment can accept" indicates that the operation request range or the number of possible requests within a certain period are within the range. However, the number of possible requests within the range indicates the number of received requests within a predetermined period of time. Further, in <<3>>, an operation request that does not match the vehicle state is rejected. For example, during traveling at 100 km/h, a request to open the door is rejected.

In <<5>>, depending on the combination of the vehicle API 171 and the unacceptable contents, it is changed whether to cache the unacceptable information for each request source or to cache it regardless of the request source. Note that determination items may be set for each vehicle API 171 in the vehicle service unit 107. That is, there may be items for which no determination is made. Here, equipment information included in the vehicle, the authentication status of the service application 106 and the presence or absence of access rights, the current vehicle status related to the equipment, and abnormality information of the vehicle and both service departments are stored in the memory 112. Further, information such as cache state information that the vehicle service unit 107 refers to when determining whether to accept the request is also stored in the memory 112.

When the vehicle service unit 107 fails to perform arbitration, transmits, to the service application 106 in S120, the error indicating that the first command cannot be accepted.

When the arbitration has been successful, the state management unit 108 receives the operation request from the vehicle service unit 107 and performs operation request arbitration in S20. In the operation request arbitration, the state management unit 108 determines whether the first command can be accepted, taking into consideration the conflict between the first command and another command different from the first command and the second command. The state management unit 108 may determine whether the request can be accepted, taking into consideration conflicts with requests received by other APIs (for example, other vehicle APIs) that are different from the API (for example, the vehicle API 171) that has received the request.

For example, the state management unit 108 performs arbitration between vehicle controls in S22, and determines whether the arbitration has been successful in S24. When the arbitration is not possible, an error is transmitted to the service application 106 in S150. When the arbitration has been successful, the process order is controlled in S26, parameter conversion is performed in S28, and the process proceeds to S160.

In addition, in S26, when making the light blink, a process of repeating the procedure of turning on, turning off, waiting for one second, and turning on is executed. Further, in S28, for example, when controlling the output, a process is executed to convert the content of the command after arbitration into a control amount such as High, Mid, or Low.

In this way, the above-described operation request acceptance determination (including the "arbitration between vehicle controls" in S14) refers to a vehicle status, etc., and determines whether the operation request can be accepted, regardless of other commands. On the other hand, in the operation request arbitration of this process (including the "arbitration between vehicle controls" in S22), it is determined whether the operation request can be accepted, taking into consideration conflicts with other commands. Note that when the state management unit 108 can accept the operation request, it generates a second command that embodies the abstracted first command as the operation command.

In S20, the state management unit 108 determines whether the operation request can be accepted, based on, for example, the following five items.

<<1>> Request priority arbitration: Whether the first command has higher priority than requests based on other applications or user operations.

<<2>> Requester cancellation request: Whether the requester has requested cancellation of the request and the request is being processed.

<<3>> User cancellation request: Whether a user request to suspend operation has occurred.

<<4>> Request processing load overload: Whether the controlled target has received more requests than it can process.

<<5>> Abnormality in state management unit 108/equipment management unit 109: Whether an abnormality (for example, data or communication abnormality, abnormal operation) has occurred in the status management unit 108 or the equipment management unit 109. Note that in <<1>>, the priority is specified by the application, and the operation based on the priority is determined by the receiving side. However, the priority specified by the application on the receiving side may be ignored and the process may be executed.

For example, in a case of receiving a request to turn on an air conditioner and a request to turn on a light, when the voltage becomes less than an electrically allowable threshold due to the reception of both requests, the state management unit 108 determines that the reception cannot be performed. In addition, in a case of receiving a request regarding acceleration and a request regarding steering, the state management unit 108 determines that the request cannot be accepted when the vehicle drive control amount that satisfies both requests may cause the vehicle to deviate from the road. Here, priority information for requests, information regarding requester cancellation, information regarding user cancellation, and threshold values that can be processed by the controlled target (for example, number of requests, control amount, processing load, etc.) are stored in the memory 112 or the memories 22, 27, and 32. Furthermore, information that the state management unit 108 refers to when determining acceptance or rejection, such as abnormality information from the status management unit 108 and the equipment management unit 109, is also stored in the memory 112 or the memories 22, 27, and 32.

Next, the state management unit 108 outputs the second command (that is, an operation command) based on the first command to each of the controllers 191 to 199 of the equipment management unit 109 in S160. After S160, the process shown in FIG. 11 ends.

Each of the control units 191 to 199 is equipped with an operation control program for operating the controlled target, and each controller 191 to 199 of the equipment management unit 109 that receives the operation instruction executes the operation control program. That is, the memory of each of ECUs 141 to 148, which is each operation control device, stores the operation control program constituting each of controllers 191 to 199, and the program is executed by the CPU.

(2-2. Second Modification)

Figure 12:
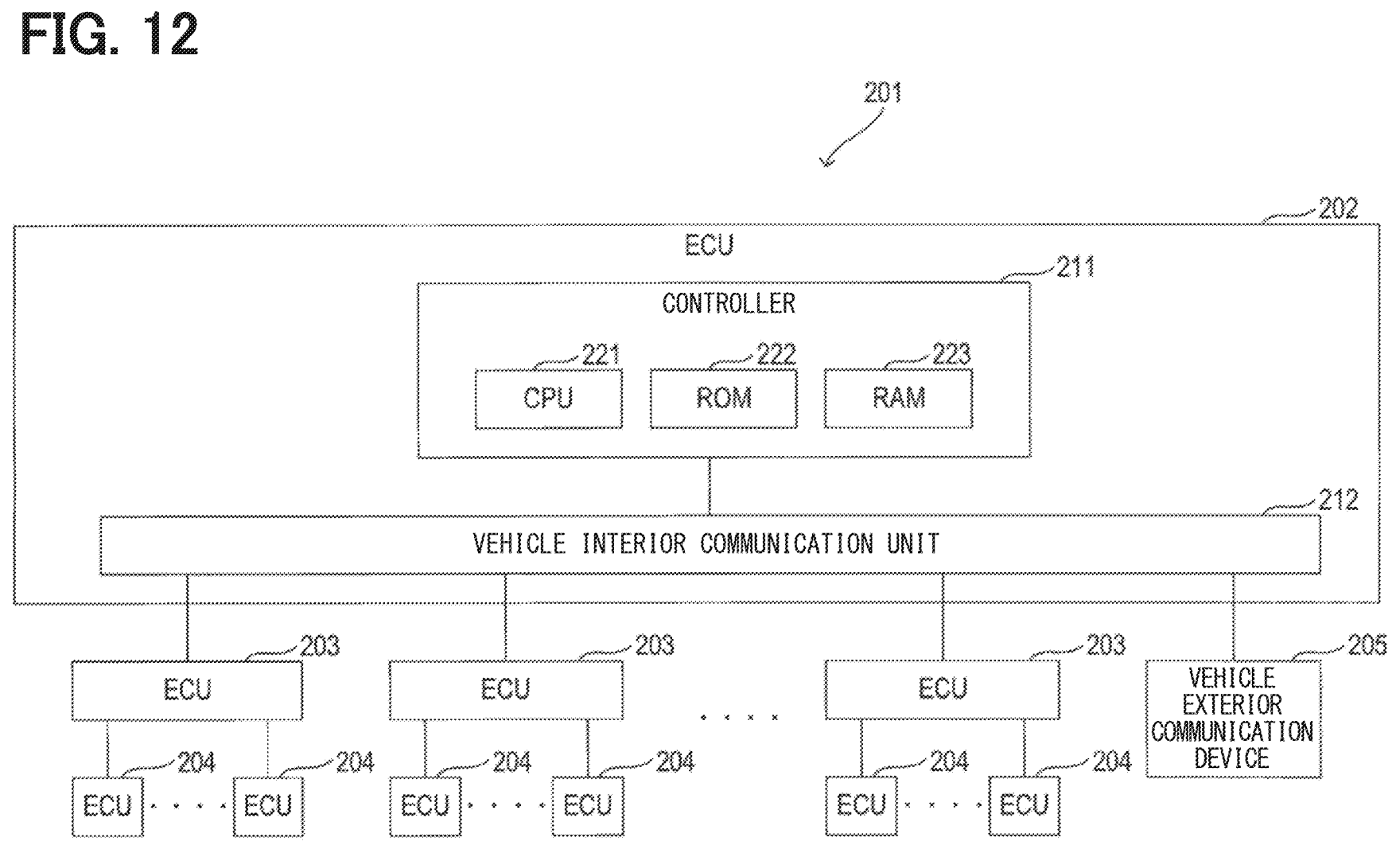

The above-described configuration can be also implemented as, for example, a specific configuration as shown in FIG. 12. In this example, the vehicle control system 201 of this embodiment is mounted on a vehicle. The vehicle may have an automated driving function in addition to a manual driving function. The vehicle may be a hybrid vehicle having an engine and an electric motor as a traveling source. The vehicle is not limited to the vehicle having the automated driving function or the hybrid vehicle, but may be a vehicle having only a manual driving function, or a vehicle having only an engine or only an electric motor as the traveling source. Hereinafter, the vehicle equipped with the vehicle control system 201 will be simply referred to as a vehicle.

As shown in FIG. 12, the vehicle control system 201 includes one ECU 202 and multiple ECUs 203. The ECU 202 controls the plurality of ECUs 203 to achieve coordinated control of the entire vehicle. That is, the ECU 202 functions as an integrated ECU.

The ECU 203 is provided for each domain divided by function in the vehicle, and mainly controls a plurality of ECUs 4 existing within the domain. Examples of domains include a power train (movement system), a body, and a chassis.

The ECU 203 belonging to the power train domain is connected to, for example, an ECU 204 that controls the engine, an ECU 204 that controls the motor, an ECU 204 that controls the battery, and the like.

For example, an ECU 204 that controls an air conditioner, an ECU 204 that controls a door, and the like are connected to the ECU 203 that belongs to the body domain.

For example, an ECU 204 that controls brakes, an ECU 204 that controls steering, and the like are connected to the ECU 203 that belongs to the chassis domain.

The ECU 203 and the ECU 204 are electronic control units mainly having a microcomputer including a CPU, ROM, RAM, and the like. The ECU 202 includes a controller 211 and a vehicle interior communication unit 212.

The controller 211 is an electronic control unit mainly having a microcomputer including a CPU 221, a ROM 222, a RAM 223, and the like. Various functions of the microcomputer are implemented by the CPU 221 executing programs stored in a non-transitory tangible storage medium. In this example, the ROM 222 corresponds to a non-transitory tangible storage medium storing programs. A method corresponding to the program is performed by executing the program. Note that part or all of the functions executed by the CPU 221 may be configured in hardware using one or more ICs. The number of microcomputers forming controller 211 may be one or more.

The vehicle interior communication unit 212 is connected to the plurality of ECUs 203 via CAN or Ethernet (registered trademark), and performs data communication with the plurality of ECUs 203. The vehicle control system 201 further includes a vehicle exterior communication device 205. The vehicle exterior communication device 205 performs data communication with a communication device outside the vehicle via a wide area wireless communication network. The vehicle exterior communication device 205 is an electronic control unit mainly having a microcomputer including a CPU, ROM, RAM, and the like. The ECU 202 performs data communication with the vehicle exterior communication device 205 via the vehicle interior communication unit 212.

(2h) The ECUs 10 to 40 and the methods described in the present disclosure may be implemented by a dedicated computer provided by configuring a processor and memory programmed to perform one or more functions embodied by a computer program. Alternatively, the ECUs 10 to 40 and the methods described in the present disclosure may be implemented by a dedicated computer provided by configuring a processor with one or more dedicated hardware logic circuits. Alternatively, the ECUs 10 to 40 and the method thereof described in the present disclosure may be implemented by one or more special purpose computers configured by a combination of a processor and a memory programmed to execute one or multiple functions and a processor configured by one or more hardware logic circuits. Furthermore, the computer program may be stored in a computer-readable non-transitory tangible recording medium as an instruction executed by the computer. The method for implementing the functions of the respective units included in the ECUs 10 to 40 does not necessarily need to include software, and all of the functions may be realized with the use of one or multiple hardware.

(2i) A plurality of functions of one component in the above-described embodiment may be implemented by a plurality of components, or one function of one component may be implemented by a plurality of components. The plurality of functions of the plurality of elements may be implemented by one element, or one function implemented by multiple elements may be implemented by one element. A part of the configuration of the above embodiment may be omitted as appropriate. Furthermore, at least a part of the configuration of the above-described embodiment may be added to or replaced with the configuration of another embodiment described above.

(2j) In addition to the vehicle control systems 1, 100, and 201 described above, a component of the vehicle control systems 1, 101, 201 such as the vehicle control device such as ECUs 10 to 40, a program for implementing the computer function as the vehicle control device, a non-transitory tangible storage medium such as a semiconductor memory in which the program is stored, and a vehicle control method may be provided to implement the present disclosure.

The invention claimed is:

1. A vehicle control device that is located in a vehicle and configured to control a controlled target by transmitting a command to a control program for controlling the controlled target, the control program including a plurality of interfaces for exchanging the command, the vehicle control device comprising:

at least one first command unit configured to output a first command that is a command that does not specify the plurality of interfaces of the control program;

a plurality of output units configured to output a received command to a corresponding interface; and at least one second command unit configured to select at least two output units for transmitting the command among the plurality of output units based on the first command, and transmit a second command to the plurality of inter-
faces by outputting the second command represent-
ing a command for causing the selected output units
to transmit the second command corresponding to
the first command, wherein each of the plurality of output units is one output unit that
is configured to transmit the second command to the
corresponding interface among the plurality of inter-
faces, and the first command specifies a control content executed by
the controlled target and does not specify the plurality
of interfaces, and the at least one second command unit
generates the second command based on the input first
command.

2. The vehicle control device according to claim 1,
wherein the first command unit, the second command unit, and the
output unit are hierarchically arranged in an order of
the first command unit, the second command unit, and
the output unit, and a command is transmitted in one direction according to
the order.

3. The vehicle control device according to claim 1,
wherein at least the second command unit is configured to generate
the second command while communicating with
another vehicle control device in cooperation with the
another vehicle control device.

4. The vehicle control device according to claim 1,
wherein the second command unit includes a plurality of second
command units, the second command includes a plurality of second com-
mands, the vehicle control device further includes an arbitration
unit configured to arbitrate the plurality of second
commands when any of the plurality of output units
receives the plurality of second commands generated
by the plurality of second command units, and the received output unit is configured to selectively output
the plurality of second commands based on an arbitra-
tion result.

5. The vehicle control device according to claim 1,
wherein the second command unit is configured to select the
plurality of output units based on one first command,
and generate the second command for each of the
plurality of selected output units.

6. The vehicle control device according to claim 1,
wherein the second command unit is configured to generate the
plurality of second commands for the selected output
unit based on one first command.

7. A non-transitory computer-readable storage medium
storing a vehicle control program executed by a vehicle
control device including a processor that is located in a
vehicle and configured to control a controlled target by
transmitting a command to a control program for controlling
the controlled target, the vehicle control program causing the
processor to input a first command that: is a command to the control
program including a plurality of interfaces for exchang-
ing the command; and is a command that does not
specify the plurality of interfaces, wherein the non-transitory computer-readable storage medium
stores a plurality of programs configured to serve as a
plurality of output units configured to output a received
command to a corresponding interface, the processor is further configured to select at least two
output units that transmit a command among the plu-
rality of output units based on the first command, and
cause each selected output unit to transmit a second
command to the corresponding interface, the second
command being a command corresponding to the first
command and representing a command for causing the
selected output units to perform transmission, and the first command specifies a control content executed by
the controlled target and does not specify the plurality
of interfaces, and the processor generates the second
command based on the input first command.

8. A non-transitory computer-readable storage medium
storing a vehicle control program configured to be executed
by a vehicle control device including a processor, the vehicle
control program causing the processor to:

receive an abstracted first command from an application;

serve as a plurality of output units configured to perform
output to a plurality of interfaces of a control program
for controlling a controlled target; and select the plurality of output units necessary for embody-
ing the first command, and transmit an intermediate
command to the plurality of selected output units, wherein the plurality of output units are configured to transmit a
second command according to the intermediate com-
mand via a corresponding interface among the plurality
of interfaces, each of the plurality of output units is one output unit that
is configured to transmit the second command to the
corresponding interface among the plurality of inter-
faces, and the first command specifies a control content executed by
the controlled target and does not specify the plurality
of interfaces, and the processor generates the second
command based on the input first command.

9. A vehicle control system comprising:

a plurality of first vehicle control devices configured to
control a controlled target mounted on a vehicle; and a second vehicle control device communicably connected
to the plurality of first vehicle control device, wherein the plurality of first vehicle control devices include:

a plurality of first input units configured to receive a
command transmitted from the second vehicle con-
trol device; and a plurality of controllers configured to control the
controlled target based on the command received by
the first input unit, and the second vehicle control device includes:

a second input unit configured to receive a command
from an application;

a calculation unit configured to process the command
from the application received by the second input
unit; and a plurality of output units configured to output a
command to the plurality of first vehicle control
devices based on a processing result by the calcula-
tion unit, the calculation unit is further configured to select at least
two output units among the plurality of output units, and cause the selected output units to transmit the command to the plurality of first vehicle control devices, and each of the plurality of output units is provided correspondingly for each of the plurality of first input units, and configured to output a command to a corresponding first input unit.

10. The vehicle control system according to claim 9, wherein the second vehicle control device includes, as a plurality of functions executable by the second vehicle control device, at least two layers of:

a first layer configured to process a command spanning a plurality of domains of vehicle control;

a second layer configured to process a command within one domain of the vehicle control;

a third layer configured to determine a control amount of the vehicle control or an order of the vehicle control; or a fourth layer having the plurality of output units.

11. The vehicle control system according to claim 10, wherein the first layer, the second layer, the third layer, and the fourth layer are hierarchized in an order of the first layer, the second layer, the third layer, and the fourth layer, and a command is transmitted in one direction according to the order.

12. A vehicle control system comprising:

a plurality of first vehicle control devices configured to control a controlled target mounted on a vehicle; and a second vehicle control device communicably connected to the plurality of first vehicle control devices, wherein the plurality of first vehicle control devices include:

a plurality of first input units configured to receive a command transmitted from the second vehicle control device; and a plurality of controllers configured to control the controlled target based on the command received by the first input unit, the second vehicle control device includes:

a second input unit configured to receive a command from an application;

a calculation unit configured to process the command from the application received by the second input unit; and a plurality of output units configured to output a command to the plurality of first vehicle control devices based on a processing result by the calculation unit, each of the plurality of output units is provided correspondingly for each of the plurality of first input units, and configured to output a command to a corresponding first input unit, and the calculation unit includes:

a first calculation unit configured to arbitrate a command between a plurality of domains of vehicle control;

a second calculation unit configured to arbitrate a command within one domain of the vehicle control; and a third calculation unit configured to determine a control amount or an order of the vehicle control.

13. A vehicle control system comprising:

a plurality of first vehicle control devices configured to control a controlled target mounted on a vehicle; and a second vehicle control device communicably connected to the plurality of first vehicle control devices, wherein the plurality of first vehicle control devices include: p2 a plurality of first input units configured to receive a command transmitted from the second vehicle control device; and a plurality of controllers configured to control the controlled target based on the command received by the first input unit, the second vehicle control device includes:

a second input unit configured to receive a command from an application;

a calculation unit configured to process the command from the application received by the second input unit; and a plurality of output units configured to output a command to the plurality of first vehicle control devices based on a processing result by the calculation unit, each of the plurality of output units is provided correspondingly for each of the plurality of first input units, and configured to output a command to a corresponding first input unit, each of the plurality of output units is provided correspondingly for each of the plurality of first input units, and configured to output a command to a corresponding first input unit, the second vehicle control device includes, as a plurality of functions executable by the second vehicle control device, at least two layers of:

a first layer configured to process a command spanning a plurality of domains of vehicle control;

a second layer configured to process a command within one domain of the vehicle control;

a third layer configured to determine a control amount of the vehicle control or an order of the vehicle control; or a fourth layer having the plurality of output units, the calculation unit includes:

a first calculation unit configured to arbitrate a command between the plurality of domains of vehicle control;

a second calculation unit configured to arbitrate a command within one domain of the vehicle control; and a third calculation unit configured to determine a control amount or an order of the vehicle control, the second calculation unit is included in the second layer, and the second calculation unit includes a plurality of second calculation units correspondingly provided for each domain of the vehicle control.

14. A vehicle control device communicatively connected to a plurality of electronic control units including a plurality of first input units configured to receive a command for controlling a controlled target mounted on a vehicle, the vehicle control device comprising:

a second input unit configured to receive a command from an application;

a calculation unit configured to process the command from the application received by the second input unit; and a plurality of output units configured to output a command to the plurality of electronic control units based on a processing result by the calculation unit, wherein the calculation unit is further configured to select at least two output units among the plurality of output units, and cause the selected output units to transmit the command to the plurality of electronic control units, and each of the plurality of output units is provided correspondingly for each of the plurality of first input units, and configured to output the command to a corresponding first input unit.

15. The non-transitory computer-readable storage medium according to claim 7, wherein the plurality of interfaces of the vehicle control program are configured such that a numerical number of the second command handled by the plurality of interfaces and a numerical number of the plurality of output units are in a one-to-one correspondence.

16. The non-transitory computer-readable storage medium according to claim 8, wherein the plurality of interfaces of the vehicle control program are configured such that a numerical number of the second command handled by the plurality of interfaces and a numerical number of the plurality of output units are in a one-to-one correspondence.

17. The vehicle control device according to claim 1, wherein a configuration of the at least one first command unit is changed by changing only the at least one second command unit without changing the control program.

18. The vehicle control device according to claim 14, wherein the control target is controlled by the command to a control program including a plurality of interfaces for exchanging the command.

19. The vehicle control device according to claim 1, wherein the second command includes the control content specified by the first command and specifies the controlled target.

20. The non-transitory computer-readable storage medium according to claim 7, wherein the second command includes the control content specified by the first command and specifies the controlled target.

21. The non-transitory computer-readable storage medium according to claim 8, wherein the second command includes the control content specified by the first command and specifies the controlled target.

* * * * *